US008209697B2

(12) United States Patent
Kobayashi et al.

(10) Patent No.: US 8,209,697 B2
(45) Date of Patent: Jun. 26, 2012

(54) RESOURCE ALLOCATION METHOD FOR A PHYSICAL COMPUTER USED BY A BACK END SERVER INCLUDING CALCULATING DATABASE RESOURCE COST BASED ON SQL PROCESS TYPE

(75) Inventors: Kazuhito Kobayashi, Yokohama (JP); Masaaki Narita, Yokohama (JP); Akira Ito, Fujisawa (JP); Sansei Ooshima, Higashimurayama (JP); Norihiro Hara, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1166 days.

(21) Appl. No.: 12/022,547

(22) Filed: Jan. 30, 2008

(65) Prior Publication Data

US 2009/0013325 A1     Jan. 8, 2009

(30) Foreign Application Priority Data

Jul. 3, 2007   (JP) ................................. 2007-175604

(51) Int. Cl.
*G06F 9/50* (2006.01)
(52) U.S. Cl. .............................. 718/104; 718/1; 707/720
(58) Field of Classification Search ........................ None
See application file for complete search history.

(56) References Cited

U.S. PATENT DOCUMENTS 6,101,495 A     8/2000   Tsuchida et al.
7,185,000 B1 *  2/2007   Brown et al. ................. 707/718
7,574,424 B2 *  8/2009   Chowdhuri ......................... 1/1
2005/0192937 A1* 9/2005  Barsness et al. .................. 707/3
2007/0233838 A1* 10/2007 Takamoto et al. ............ 709/223

FOREIGN PATENT DOCUMENTS

| JP | 7-141394 A | 6/1995 |
|---|---|---|
| JP | 11-39340 A | 2/1999 |
| JP | 2005-056391 | 3/2005 |

OTHER PUBLICATIONS

Estrada, "Informix Unleashed: Chapter 19—Parallel Database Query", SAMS Publishing, May 20, 2006, 22 pages, retrieved from http://web.archive.org/web/20060520204921/http://podgoretsky.com/ftp/Docs/DB/Informix%20Unleashed/ch19/ch19.htm.*
Gounaris et al., "Parallel Query Processing On The Grid", 2009 or later, 12 pages.*
"Parallel Database Systems: the Future of High Performance Database Systems", Communications of the ACM, vol. 35, No. 6, Jun. 1992, pp. 85-98.
"A Hierarchical Approach to Parallel Multi-Query Scheduling" by J. Wolf, et al. Jun. 1995, pp. 1-24.

* cited by examiner

*Primary Examiner* — David Huisman
(74) *Attorney, Agent, or Firm* — Mattingly & Malur, P.C.

(57) ABSTRACT

A resource allocation method, a resource allocation program, and a resource allocation apparatus in which a request reception server subjects an inputted SQL to a syntax analysis. At least one SQL process is extracted from the input SQL, and a resource cost of a database required by a BES (Back End Server) to perform the SQL process for each of one or more process types contained in the SQL process is calculated. Further, an allocation ratio is determined for allocating the resource of a request executing server to a virtualized server in accordance with a resource cost ratio required by each of the BES to execute the SQL process. Additionally, requests are made for execution of the respective BES on the virtualized server to which the resource has been allocated so as to execute the SQL process.

6 Claims, 13 Drawing Sheets

FIG.1A

SQL SENTENCE

```
SELECT T1.C1
FROM T1,T2
WHERE T1.C2=T2.C2 AND T1.C1>1 AND T2.C1>2
```

FIG.1B

CPU ALLOCATION AND SQL EXECUTION PLAN ACCORDING TO THE PRESENT EMBODIMENT

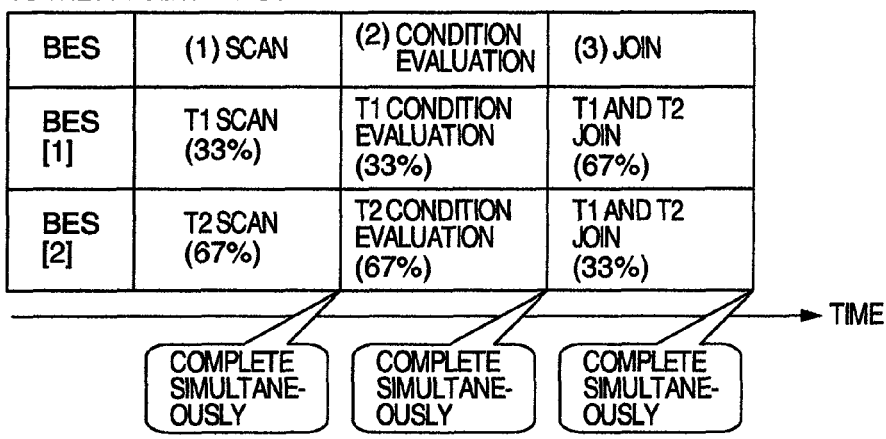

| BES | (1) SCAN | (2) CONDITION EVALUATION | (3) JOIN |
|---|---|---|---|
| BES [1] | T1 SCAN (33%) | T1 CONDITION EVALUATION (33%) | T1 AND T2 JOIN (67%) |
| BES [2] | T2 SCAN (67%) | T2 CONDITION EVALUATION (67%) | T1 AND T2 JOIN (33%) |

→ TIME

COMPLETE SIMULTANEOUSLY — COMPLETE SIMULTANEOUSLY — COMPLETE SIMULTANEOUSLY

FIG.1C

CPU ALLOCATION AND SQL EXECUTION PLAN IN COMPARATIVE EXAMPLES

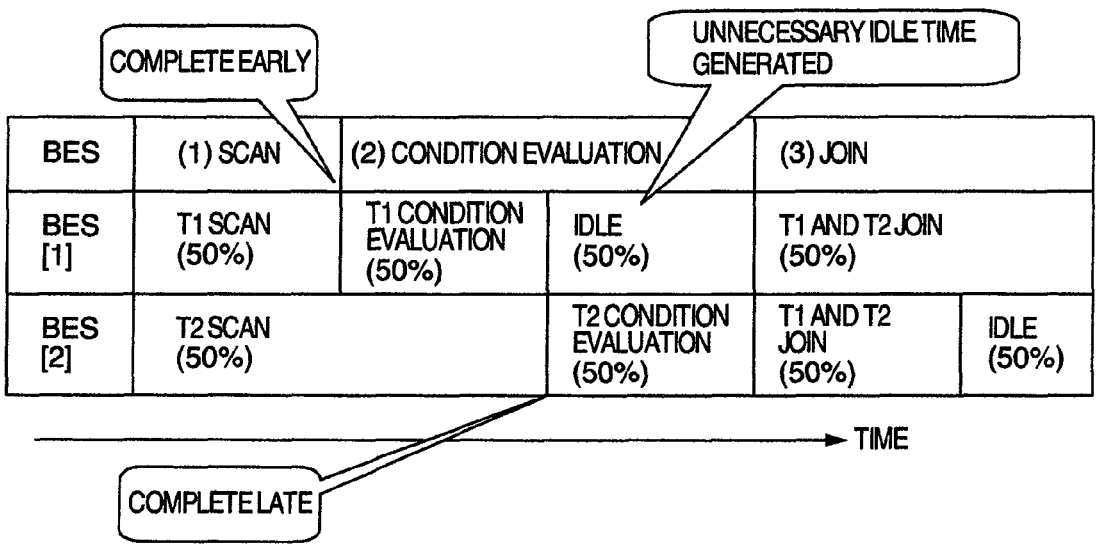

| BES | (1) SCAN | (2) CONDITION EVALUATION | | (3) JOIN | |
|---|---|---|---|---|---|
| BES [1] | T1 SCAN (50%) | T1 CONDITION EVALUATION (50%) | IDLE (50%) | T1 AND T2 JOIN (50%) | |
| BES [2] | T2 SCAN (50%) | | T2 CONDITION EVALUATION (50%) | T1 AND T2 JOIN (50%) | IDLE (50%) |

COMPLETE EARLY — UNNECESSARY IDLE TIME GENERATED

→ TIME

COMPLETE LATE

FIG. 5A

16 STATISTICAL INFORMATION

| # | BES | TABLE NAME | COLUMN NAME | CAPACITY | NUMBER OF CASES | INDEX |
|---|------|------|------|------|--------|------|
| 1 | BES1 | T1 | C1 | 20GB | 200000 | NONE |
| 2 | BES1 | T1 | C2 | 10GB | 200000 | NONE |
| 3 | BES2 | T2 | C1 | 100GB | 400000 | NONE |
| 4 | BES2 | T2 | C2 | 50GB | 400000 | NONE |

FIG. 5B

17 PROCESSING COST MANAGING TABLE

| # | SQL PROCESS | BES1 | | | | BES2 | | | | UNDECIDED | |
|---|---|---|---|---|---|---|---|---|---|---|---|
| | | CPU COST | MEMORY COST | NUMBER OF PROCESSING CASES | PROCESSING AMOUNT | CPU COST | MEMORY COST | NUMBER OF PROCESSING CASES | PROCESSING AMOUNT | CPU COST | MEMORY COST |
| 1 | (1) SCAN | 20 | 40 | 200000 | 20GB | 40 | 200 | 400000 | 10GB | NONE | NONE |
| 2 | (2) CONDITION EVALUATION | 20 | 40 | 40000 | 2GB | 40 | 200 | 80000 | 10GB | NONE | NONE |
| 3 | (3) JOIN | 40 | 200 | 80000 | 10GB | 20 | 100 | 40000 | 2GB | NONE | NONE |

FIG.6A

18 RESOURCE ALLOCATION MANAGING TABLE

| # | SQL PROCESS | BES1 | | | | BES2 | | | |
|---|---|---|---|---|---|---|---|---|---|
| | | CPU COST | CPU ALLOCATION RATIO | MEMORY COST | MEMORY ALLOCATION RATIO | CPU COST | CPU ALLOCATION RATIO | MEMORY COST | MEMORY ALLOCATION RATIO |
| 1 | (1) SCAN | 20 | 33 | 40 | 17 | 40 | 67 | 200 | 83 |
| 2 | (2) CONDITION EVALUATION | 20 | 33 | 40 | 17 | 40 | 67 | 200 | 83 |
| 3 | (3) JOIN | 40 | 67 | 200 | 67 | 20 | 33 | 40 | 83 |

FIG.6B

21 COST MANAGING MASTER TABLE

| # | SQL PROCESS | CPU COST | | | MEMORY COST | | |
|---|---|---|---|---|---|---|---|
| | | VALUE SERVING AS KEY | UNIT | VALUE PER UNIT | VALUE SERVING AS KEY | UNIT | VALUE PER UNIT |
| 1 | (1) SCAN | NUMBER OF PROCESSING CASES | NUMBER OF CASES | 0.0001 | PROCESSING AMOUNT | GB | 2 |
| 2 | (2) CONDITION EVALUATION | NUMBER OF PROCESSING CASES | NUMBER OF CASES | 0.0005 | PROCESSING AMOUNT | GB | 20 |
| 3 | (3) JOIN | NUMBER OF PROCESSING CASES | NUMBER OF CASES | 0.0005 | PROCESSING AMOUNT | GB | 20 |

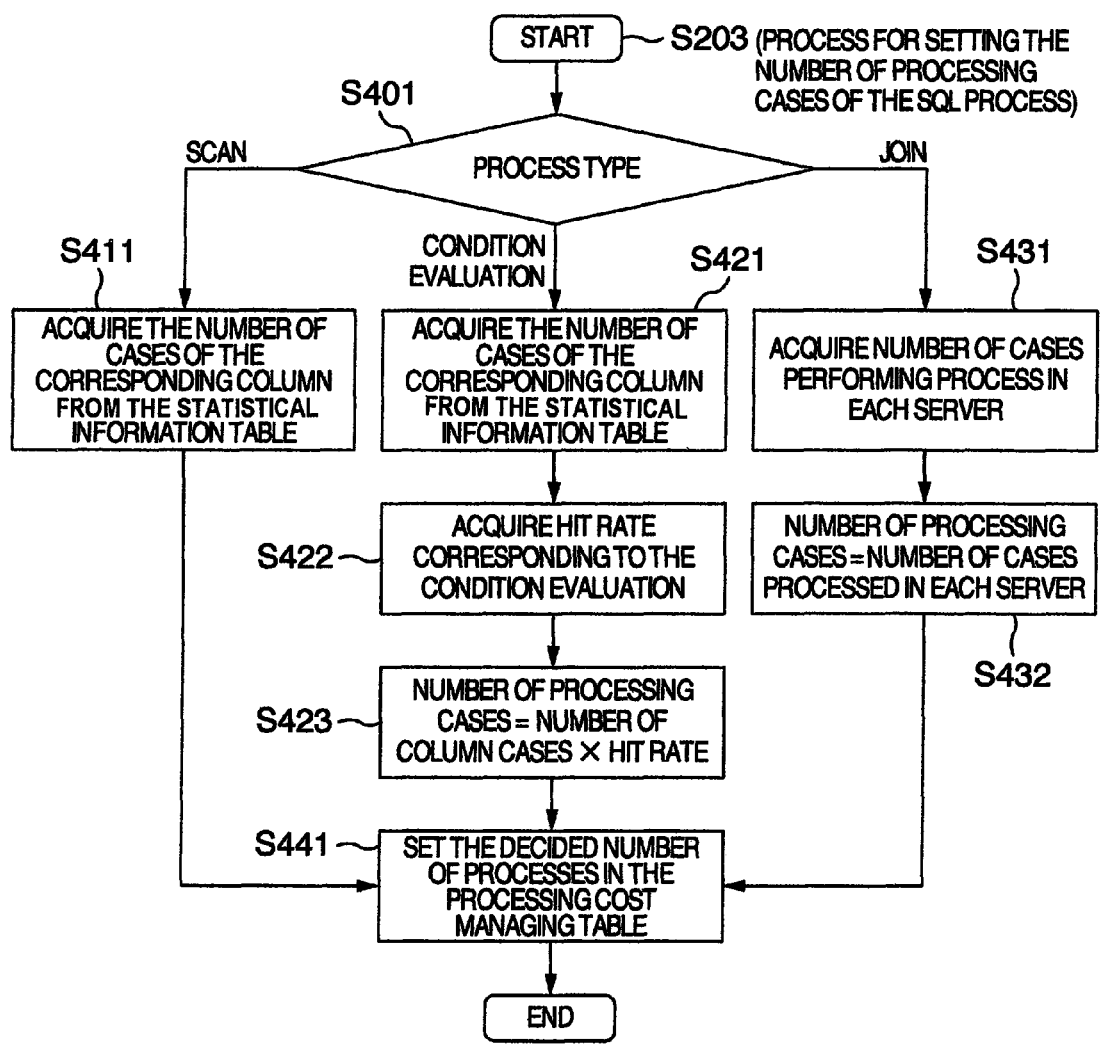

RESOURCE ALLOCATION METHOD FOR A PHYSICAL COMPUTER USED BY A BACK END SERVER INCLUDING CALCULATING DATABASE RESOURCE COST BASED ON SQL PROCESS TYPE

CLAIM OF PRIORITY

The present application claims priority from Japanese application JP2007-175604 filed on Jul. 3, 2007 the content of which is hereby incorporated by reference into this application.

BACKGROUND OF THE INVENTION

The present invention relates to a resource allocation method and a resource allocation program which can be appropriately applied to a relational database management system and a technique associated with a managing server which manages the resource allocation.

A DBMS (Database Management System) is a system for responding to a query about data in a database. Especially widely used is a RDBMS (Relational Database Management System) in which a database is described in a table format. As a language describing the data query, the SQL (Structured Query Language) is widely used.

In order to respond to a number of queries, it is necessary to reduce the time required for processing each of the queries. For example, conventionally, processing of the queries are distributed to a plurality of SQL and each of the SQL processes is distributed to a plurality of computers so as to be executed in a parallel process such as a pipeline process.

It should be noted that the distribution algorithm which decides which SQL is to be distributed to which computer is very important. For example, according to the technique disclosed in Joel L. Wolf, John Turek, Ming-Syan Chen and Philip S. Yu, "A Hierarchical Approach to Parallel Multiquery Scheduling", IEEE Transactions on Parallel and Distributed Systems, 6 (6): 578-590, June 1995, each of the SQL processes is distributed according to various statistical information associated with the queries to be processed and stored in a DBMS dictionary.

Moreover, David DeWitt and Jim Gray, "Parallel Database Systems: The Future of High Performance Database Systems", COMMUNICATIONS OF THE ACM, vol. 35, No. 6, June 1992, P. 85-P. 98 discloses an architecture for distributing a database processing load to a plurality of computers for parallel execution. In a Shared everything architecture, Shared disk (shared use type) architecture disclosed in this document, all the computers executing the DB (database) processes can access all the data.

In a Shared nothing (non-shared use type) architecture, only the data stored in a disk connected to a local computer can be accessed. As compared to the Shared everything type architecture, in the Shared nothing type architecture, the amount of the shared resource between the configuration unit executing the DB process is small and the scalability is excellent. However, when data deviation is present in each of the computers, a load is concentrated in a particular computer and a processing overhead is generated as compared to a case when effective parallel processing is executed without deviation.

To cope with this, JP-A-2005-56391 builds a plurality of virtual computers existing in the same computer and performs computer resource allocation according to the computer CPU resource information, thereby balancing the load.

SUMMARY OF THE INVENTION

The distribution algorithm significantly affects the utilization efficiency of the resources (CPU and memory) of the DB access server (hereinafter, referred to as BES: Back End Server) accessing a disk. For example, when the process distribution is unsuccessful and processes are concentrated to a particular BES, the other BES should wait in an idle state.

That is, a resource imbalance occurs and it is impossible to effectively use BES resources. Especially in the Shared nothing type architecture, a BES waiting for a process occupies the disk to be accessed and the processing overhead is increased by the resource imbalance.

It is therefore an object of the present invention to solve the aforementioned problems and improve the load imbalance in execution of each SQL process on each BES so as to increase the speed of SQL execution.

In order to achieve the aforementioned object, the present invention provides a resource allocation method for a physical computer used when a database connected to a BES (Back End Server) executed in a virtual computer operating on a physical computer executes an SQL process. The method is characterized by the steps of: subjecting an inputted SQL to a syntax analysis and extracting at least one SQL process from the SQL, calculating a resource cost of the database required by the BES to perform the SQL process for each of process types contained in the SQL process, deciding an allocation ratio for allocating the resource of the physical computer to the virtual computer in accordance with a resource cost ratio of each of the BES required by each of the BES to execute the SQL process, and requesting for execution of the respective BES in the virtual computer to which the resource has been allocated so as to execute the SQL process. The method will be shown later.

The present invention improves the load imbalance in execution of each SQL process to a BES, which in return increases the speed of the SQL execution speed.

Other objects, features and advantages of the invention will become apparent from the following description of the embodiments of the invention taken in conjunction with accompanying drawings.

BRIEF DESCRIPTION OF THE DRAWINGS

FIGS. 1A-1C show examples of SQL execution in the DBMS according to an embodiment of the present invention.

FIGS. 5A and 5B show configurations of statistical information and a process cost managing table according to an embodiment of the present invention.

FIGS. 6A and 6B show configurations of a resource allocation managing table and a cost managing master table according to an embodiment of the present invention.

FIGS. 10A and 10B are flowcharts showing procedures for setting the number of processing cases and the processing amount in the processing cost managing table according to an embodiment of the present invention.

DETAILED DESCRIPTION OF THE INVENTION

Figure 2:
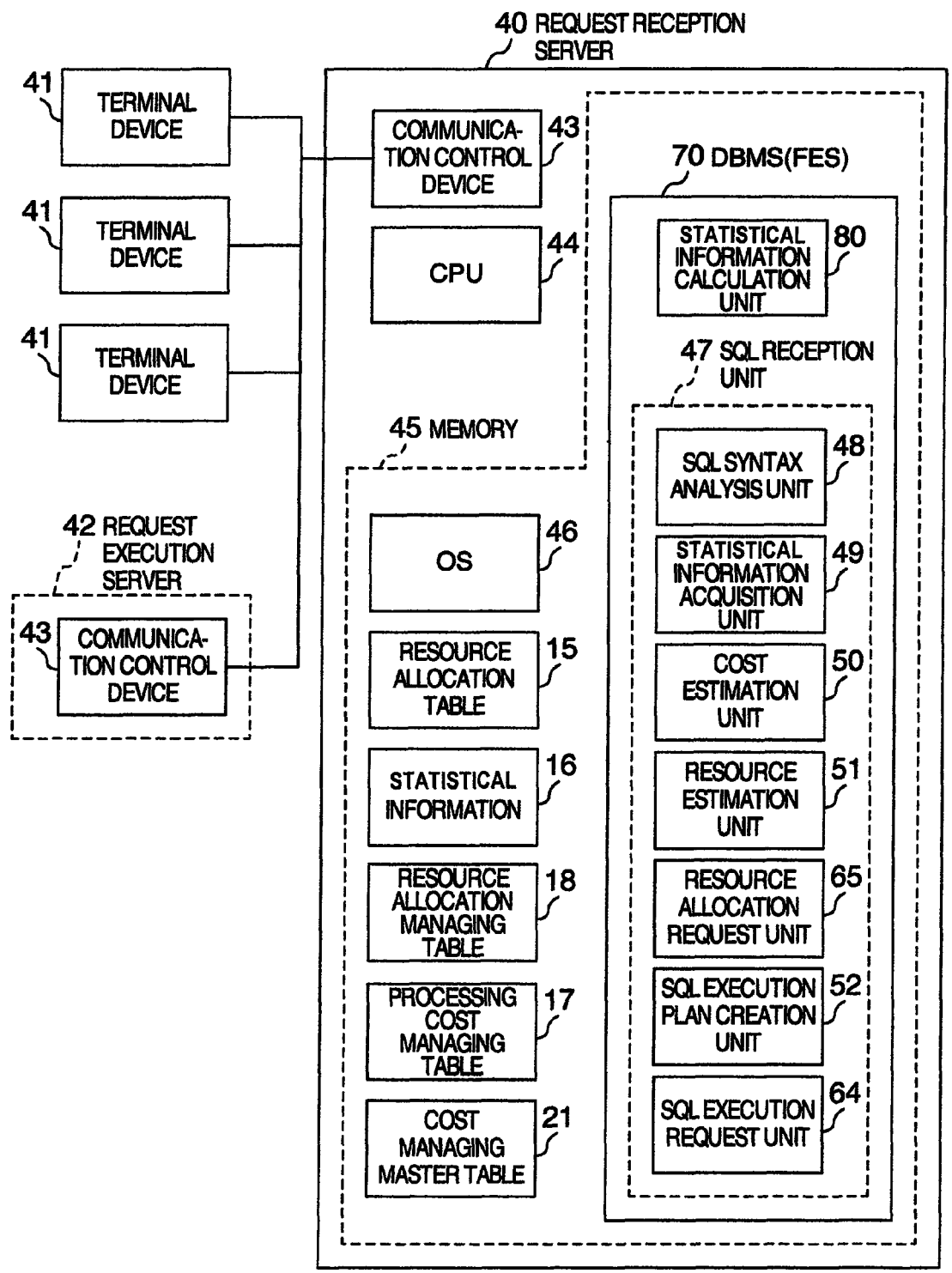
FIG. 2 is a block diagram showing an outline of the configuration of an SQL request reception process according to an embodiment of the present invention.

Description will now be directed to DBMS according to an embodiment of the present invention with reference to drawings.

FIGS. 1A-1C show execution examples of the SQL process in the DBMS. The SQL in FIG. 1A is divided into SQL processes which are distributed to respective BES for execution as shown in FIG. 1B or FIG. 1C.

The SQL in FIG. 1A is subjected to the SQL process as follows. It should be noted that the DBMS executes the SQL process in the order shown below.

T1, T2 scanning: (Acquire data existing in T1, T2) from "SELECT T1.C1 FROM T1, T2"

T1 condition evaluation: (Judge whether the acquired data corresponds to the condition and narrows the data to the lines which corresponds to the condition) from "T1.C1>1"

T2 condition evaluation: (Judge whether the acquired data corresponds to the condition and narrow the data to the lines which corresponds to the condition) from "T2.C1>2"

T1 and T2 join: (For the narrowed T1 and T2 data, perform the join process for the lines corresponding to T1.C2=T2.C2) from "T1.C2=T2.C2"

It should be noted that the T1 condition evaluation is executed after the T1 scan. The T2 condition evaluation is executed after the T2 scan. The T1 and T2 join is executed after the T1 condition evaluation and the T2 condition evaluation. Accordingly, if only the T1 condition evaluation is completed and the T2 condition evaluation is not completed, an idle time is generated for synchronization during a period until the T2 condition evaluation is completed.

Firstly, FIG. 1B explains the CPU allocation and the SQL execution plan according to the present embodiment. The SQL execution plan defines which BES is to be executed by which algorithm for each of the divided SQL processes.

BES "1" and BES "2" are different from each other. Three SQL processes (scan, condition evaluation, join) are allocated in time series to each BES. It should be noted that "T1 scan (33%)" indicates that the CPU allocation ratio for executing the SQL process of "T1 scan" is 33% of all the CPU resources which can be allocated. How to decide the CPU allocation ratio will be detailed later with reference to FIG. 4.

Before the SQL is executed, 33% of the CPU resource is allocated to BES "1" and 67% of the CPU resource is allocated to BES "2". If (1) scan and (2) condition evaluation are executed by using the allocated resource, BES "1" and BES "2" almost simultaneously complete (1) the scan and (2) the condition evaluation processes. This is realized by a balanced CPU resource allocation executed in accordance with the CPU allocation ratio calculated according to a highly accurate estimation so that the respective BES calculations are simultaneously completed.

After this, as will be detailed with reference to FIG. 4, 67% of the CPU resource is allocated to BES "1" and 33% of the CPU resource is allocated to BES "2" and then (3) the join is executed. By using the highly accurate CPU allocation ratio, the parallel executions of the processes are completed almost simultaneously. Thus, even when the data amounts of the data of T1 and T2 have large unevenness, it is possible to effectively perform the SQL processes in parallel, thereby reducing the total processing time.

On the other hand, FIG. 1C explains the CPU allocation and SQL execution plan based on a comparison example. An identical amount of CPU resource is allocated to each of the BES and the allocation ratio 50% is not changed as the time elapses.

When executing SQL process (1) scan, the CPU resources of the respective BES are equal and the SQL process type "scan" is also identical. However, the data amounts of the T1 and T2 data as the objects data of the SQL process are different and the data amount of T2 is greater than the data amount of T1. Accordingly, the moments when the respective BES complete the scan are also uneven.

Since the data amount of T1 is smaller, the BES "1" completes (1) scan and (2) condition evaluation earlier. On the other hand, the data amount of T2 is larger and BES "2" completes (1) scan and (2) condition evaluation later. Accordingly, in BES "1", an empty time (idle in the figure) when no SQL process is executed is generated from the moment when BES "1" has completed the (2) condition evaluation until BES "2" completes (2) condition evaluation. This empty time reduces the resource use ratio of BES "1".

Furthermore, when executing the SQL process (3), the process is distributed to BES "1" and BES "2". Here also, if the data amounts processed by the respective BES are uneven, the moments when the respective BES complete the join are also uneven. As a result, the BES "2" which has completed (3) join should wait for completion of (3) join by the BES "1". Accordingly, an empty time (idle in the figure) when no SQL process is executed is generated. This reduces the resource use ratio of the BES "2".

It should be noted that according to the aforementioned document, i.e., Joel L. Wolf, John Turek, Ming-Syan Chen and Philip S. Yu, "A Hierarchical Approach to Parallel Multiquery Scheduling", in order to increase the speed of SQL execution, it is preferable that the processes executed in parallel be completed simultaneously. However, in the method of FIG. 1C, the load imbalance is not improved sufficiently and the speed of the SQL query process cannot be increased.

FIG. 2 is a block diagram showing the entire configuration of the DBMS. The DBMS includes: a terminal device 41 for inputting an SQL request as the instruction information to use the database and displaying the content of the database; a request reception server 40 (resource allocation apparatus) for receiving the SQL request from the terminal device 41; and a request execution server 42 for executing the SQL process according to the instruction from the request reception server 40. The terminal device 41 transmits the SQL request to the DBMS (FES) 70 via a network by the communication control device 43.

The request reception server 40 includes: a CPU 44 for executing a process; a communication control device 43 for performing communication via the network; and a memory 45 for storing a program for realizing various processing units. The memory 45 contains OS 46 and DBMS (FES: Front End Server) 70 operating on the OS 46 and operates by using the CPU 44.

Figure 3:
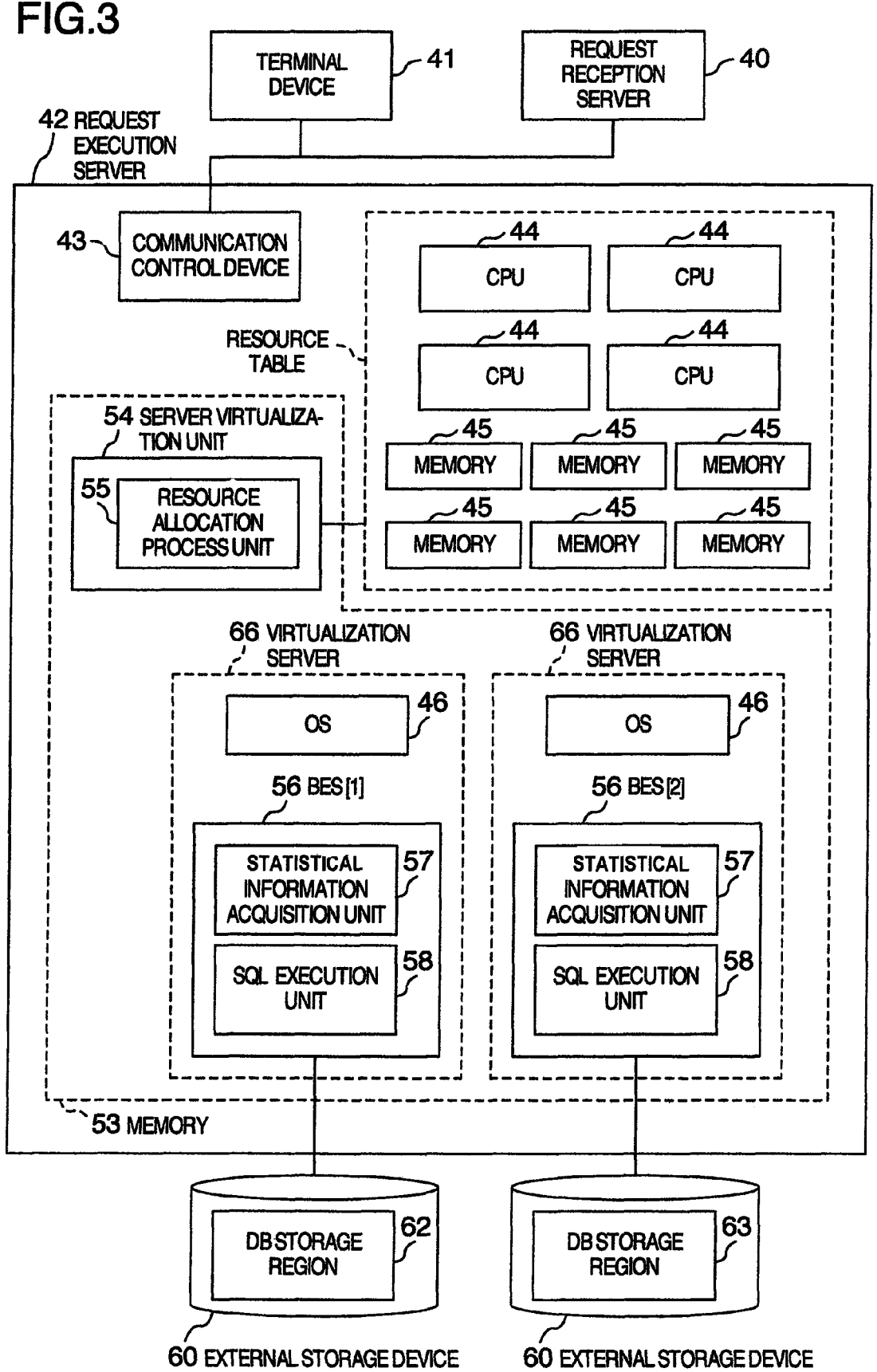
FIG. 3 is a block diagram showing the entire DBMS according to an embodiment of the present invention.

Here, the FES (Front End Server) is a part of the DBMS (FES) 70 in charge of the functions to interpret the inputted SQL request by a part of the DBMS (FES) 70, create an SQL execution plan 13 (see FIG. 4), and transmit an execution request of the SQL execution plan 13 to the BES 56 (see FIG. 3). The DBMS (FES) 70 includes an SQL reception unit 47 for receiving a SQL request inputted from the terminal device 41; and a statistical information calculating unit 80 for calculating the statistical information 16 on data as a processing object of the SQL request received by the SQL reception unit 47.

The SQL reception unit 47 includes an SQL syntax analysis unit 48, a statistical information acquisition unit 49, a cost estimation unit 50, a resource estimation unit 51, a resource allocation request unit 65, an SQL execution plan creation unit 52, and an SQL execution request unit 64. Moreover, the memory contains a resource allocation table 15, a table of statistical information 16, a processing cost managing table 17, a resource allocation managing table 18, and a cost managing master table 21. The respective processing units and the tables will be detailed in FIG. 4 and FIGS. 6A, 6B.

FIG. 3 shows a detailed configuration of the request execution server 42 of FIG. 2. The request execution server 42 includes a communication control device 43, a CPU 44, a memory 45, and a memory 53. The memory 53 includes a server virtualization unit 54 having a resource allocation processing unit 55, and a plurality (two in the figure) of virtualized servers 66 (virtual computers).

The server virtualization unit 54 builds the plurality of virtual computers existing in the same computer as virtual servers 66 and allocates the CPU 44 and the memory 45 which are resources of the computer allocated in the resource pool to the respective virtual servers 66 so as to equalize the loads of the respective virtual servers 66. Thus, the respective virtual servers 66 operate by using the resources allocated by the server virtualization unit 54. It should be noted that the memory 45 and the memory 53 are realized, for example, by a flash memory and a silicon memory.

The virtualized servers 66 are realized by the LPER (Logical Partition) technique which divides one physical computer into a plurality of logical computers. Software for realizing the LPER may be, for example, a VMware Server produced by the VMware company. Moreover, the virtualized servers 66 share the CPU 44 and the memory 45 of the physical computer. As is disclosed in the aforementioned document JP-A-2005-56391, the CPU 44 and the memory 45 are allocated with an arbitrary ratio to the respective virtualized servers 66 by the resource ratio process of the server virtualization unit 54.

Each of the virtualized servers 66 has an OS 46 and a BES 56 and is connected to an external storage device 60 by a magnetic storage device or the like. The external storage device 60 manages DB storage regions 62, 63. The BES 56 "1" is connected directly to the DB storage region 62 and the BES 56 "2" is connected directly to the DB storage region 63. It is possible to use the Shared nothing type architecture in which only the BES 56 having the direct connection relation has the access right to the respective storage regions 62, 63 of the connection destination. Each of the BESs 56 has a statistical information acquisition unit 57 and an SQL execution unit 58.

On the other hand, it is also possible to employ the Shared everything type architecture in which all the BES 56 have the access right to the DB storage regions 62, 63. Each of the BES 56 has a statistical information acquisition unit 57 and an SQL execution unit 58.

It should be noted that the DBMS (FES) 70 of FIG. 2 is arranged in the request reception server 40 which is a separate computer from the BES 56. However, the DBMS (FES) 70 and the BES 56 may be arranged in the same computer, i.e., the request execution server 42. Furthermore, the DBMS (FES) 70 may be arranged in the virtualized servers 66 of the request execution server 42.

Figure 4:
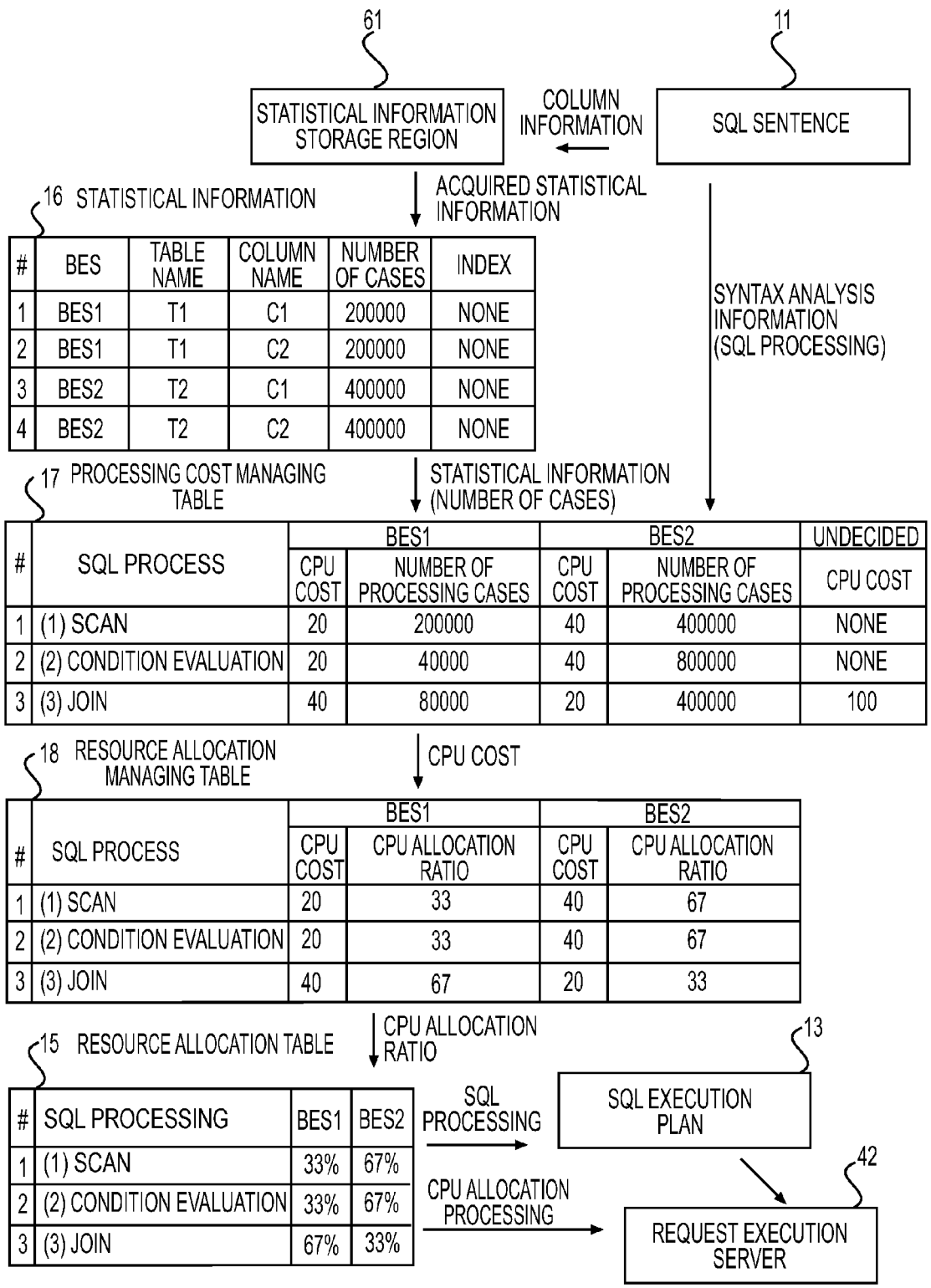
FIG. 4 shows configuration of a request execution server in the entire DBMS according to an embodiment of the present invention.

FIG. 4 explains the outline of the SQL request reception process executed by the request reception server 40. Explanation will be given with reference to FIG. 2 when required. It should be noted that in order to simplify the explanation, attention is paid on the CPU as an example of the resource. Accordingly, the columns associated with memories of respective tables (the statistical information 16, the processing cost managing table 17, and the resource allocation managing table 18) are partially omitted. The omitted part will be explained in FIGS. 5A, 5B, 6A and 6B.

When the SQL sentence 11 is subjected to a syntax analysis, syntax analysis information (SQL process) and the column information on the table to be subjected to the SQL process are extracted. A statistical information storage region 61 is used to store the statistical information 16 such as table column information.

The processing cost managing table 17 is used to store statistical information such as the number of cases acquired from the statistical information 16 and the number of the respective BES processing cases calculated according to the syntax analysis information (SQL process) extracted from the SQL sentence 11. Furthermore, the processing cost managing table 17 stores the CPU cost of each BES calculated from the number of processing cases of each BES.

The resource allocation managing table 18 stores the CPU cost of each BES stored in the processing cost managing table 17 while correlating it with the CPU allocation ratio set according to the ratio of the CPU cost. The resource allocation table 15 stores the CPU allocation ratio of the resource allocation managing table 18 for each of the SQL processes extracted from the SQL sentence 11.

The CPU allocation process based on the CPU allocation ratio of the resource allocation table 15 is executed on the request execution server 42 and then the SQL execution plan based on the SQL process of the resource allocation table 15 is transmitted as an SQL process execution request to the request execution server 42.

The SQL reception unit 47 receives the SQL sentence 11, performs an execution request to the BES 56, and finally returns a result to the terminal device 41.

The SQL syntax analysis unit 48 subjects the received SQL sentence 11 to a syntax analysis such as an SQL phrase analysis. The SQL syntax analysis unit 48 divides the SQL process into a plurality of SQL processes so that the SQL processes are executed in parallel by a plurality of computers. For example, the SQL syntax analysis unit 48 divides the SQL request of FIG. 1A into three SQL processes: (1) scan, (2) condition evaluation, and (3) join. Furthermore, the SQL syntax analysis unit 48 not only analyzes the SQL syntax but also analyzes information on the columns required for processing the SQL sentence 11.

The statistical information acquisition unit 49 acquires statistical information 16 on the column required for processing the SQL sentence 11 according to the column information required for processing the SQL sentence 11 from the statistical information storage region 61 stored in the external storage device 60 in FIG. 3. The statistical information 16 shown in FIG. 4 executes management for each BES while correlating the table name, column name, the number of cases, and Index. For example, for the record of "#1", the table name "T1" contains "200000" cases of records and the table name "T1" has the column name "C1" to which Index for high-speed access is not attached.

The cost estimation unit 50 estimates the number of processing cases for each of BES 56 according to the statistical information 16 acquired by the statistical information acquisition unit 49 for each of the SQL processes divided by the SQL syntax analysis unit 48. Here, the number of processing cases is a predicted value of the data cases accessed in each of the SQL processes.

The cost estimation unit 50 estimates the CPU cost according to the number of process cases of each of BES 56. Here, what is called cost is a CPU and a memory which are required for the DBMS to execute a process and which are shown in a numerical value. As the cost value increases, more CPU 44 and more memory resources are required.

Here, some joins and some sort processes need not be executed in a predetermined BES. For this, the cost estimation unit 50 makes no BES 56 to perform execution to be decided at this moment for the SQL process which need not be executed in the predetermined BES. By these processes, the cost estimation unit 50 creates the processing cost managing table 17.

The resource estimation unit 51 references the CPU cost of each SQL process described in the processing cost managing table 17 and decides the CPU allocation ratio. After the CPU allocation ratio is decided, the resource estimation unit 51 decides the CPU allocation ratio and the BES 56 to perform execution according to the CPU cost for the SQL process for which execution of the BES 56 has been made undecided. As a result, the resource estimation unit 51 creates the resource allocation managing table 18.

The resource allocation request unit 65 references the resource allocation managing table 18 and extracts the CPU allocation ratio of each BES 56 so as to create the resource allocation table 15. The resource allocation request unit 65 transmits the resource allocation table 15 to the resource allocation processing unit 55 so as to perform a resource allocation request.

The SQL execution plan creation unit 52 references the resource allocation table 15 and creates the SQL execution plan 13. The SQL execution request unit 64 transmits the SQL execution plan 13 to the SQL execution unit 58 of each BES 56 so as to perform an SQL execution request. The resource allocation processing unit 55 references the resource allocation table 15 and allocates a CPU resource.

The SQL execution unit 58 of the request execution server 42 uses the resource allocated by the resource allocation processing unit 55 so as to accesses the DB storage regions 62, 63 according to the SQL execution plan 13 and executes it and returns the results to terminal device 41.

FIG. 5A shows an example of the statistical information 16. In addition to the columns already explained in FIG. 4, the statistical information 16 includes a table capacity indicated by the table name for each BES. When the Index is "present", instead of directly accessing the stored value, its Index is pursued to know the detailed distribution state of the values actually stored. According to the distribution information, it is possible to improve the accuracy of the estimation about the number of cases after the condition evaluation.

The estimated number of scan cases for the table having Index may be reduced to less than 100% of cases for the cases of the data stored in the table. This is because the storage position of the data required for scan can be known according to the Index and there is no need of using the 1000-method for accessing all the data in the table. However, the Index cannot be applied to particular cases (wild card search, backward matching search), which reduces the general-purpose characteristic.

FIG. 5B shows an example of the processing cost managing table 17. The processing cost managing table 17 manages the CPU cost, the memory cost, the number of processing cases, and the processing amount for each of the SQL processes. For example, for BES "1", 200000 cases of the SQL processes of the type (1) scan are allocated. In order to execute the allocated processing amount of 20 GB, the CPU cost of 20 and the memory cost of 40 are required. Moreover, information on the SQL process for which the server used for execution is not yet decided is also simultaneously stored.

FIG. 6A shows an example of the resource allocation managing table 18. The resource allocation managing table 18 manages the CPU cost of each BES 56, the CPU allocation ratio, the memory cast, and the memory allocation ratio for each SQL process. Each of the CPU costs and the memory costs are data extracted from the processing cost managing table 17.

FIG. 6B shows an example of the cost managing master table 21. The table 21 stores information used for calculating the CPU cost and the memory cost for each SQL process. As the information used for calculating the CPU cost, a value serving as the key, its unit, and a value per unit (a predetermined coefficient) are stored. Similarly, as the information used for producing the memory cost, a value serving as the key, its unit, and a value per unit (a predetermined coefficient) are stored. For example, the CPU cost required for executing the SQL process of (1) scan is 0.0001 per unit of one processing case as the value serving as the key.

Figure 7:
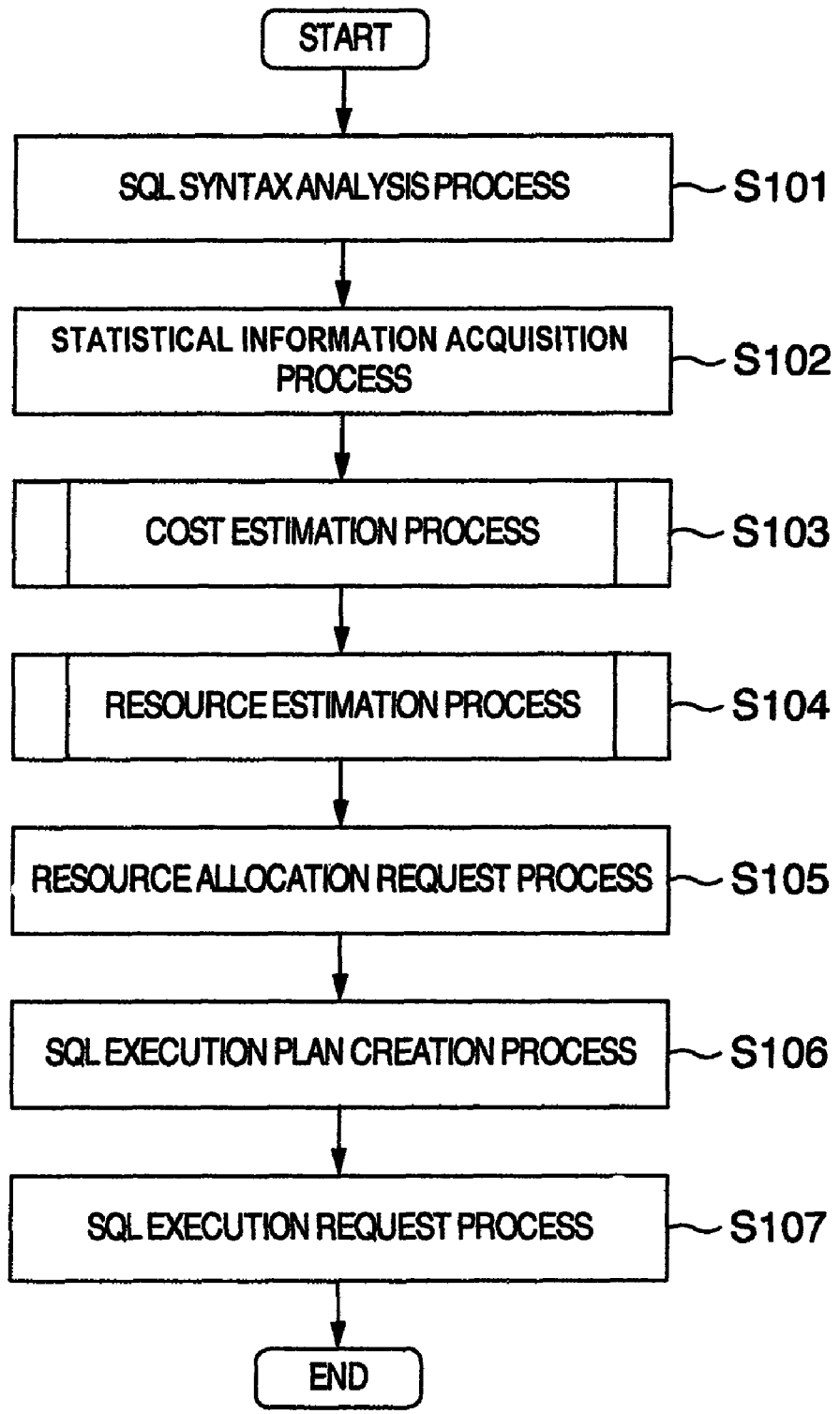
FIG. 7 is a flowchart showing a procedure of an SQL reception unit according to an embodiment of the present invention.

FIG. 7 is a flowchart showing a procedure of the SQL reception unit 47.

Upon reception of an SQL processing request from the terminal device 41, the SQL syntax analysis unit 48 performs a syntax analysis of the SQL sentence 11 inputted as a processing request (S101) and divides it into a plurality of SQL processes so that the requested process is processed in parallel by a plurality of BES. Moreover, column information required for processing the SQL sentence 11 is created.

The statistical information acquisition unit 49 acquires statistical information 16 on the columns required for processing the SQL sentence 11 from the statistical information storage region 61 according to the information on the columns required for processing the SQL sentence 11 created in S101 (S102).

The cost estimation unit (50) references the statistical information 16 on the columns required for processing the SQL sentence 11 and estimates a processing cost of each SQL process in each BES 56 (S103) so as to create the processing cost managing table 17. The resource estimation unit 51 references the processing cost managing table 17 and estimates the resource of each SQL process in each BES 56 (S104) so as to create the resource allocation managing table 18.

The resource allocation request unit 65 references the processing cost managing table 17, creates the resource allocation table 15 for deciding the resource allocation ratio of each BES 66, and transmits it to the resource allocation process 55 of the server virtualization unit 54 so as to request for a resource allocation (S105).

The SQL execution plan creation unit 52 references the resource allocation table 15 and creates the SQL execution plan 13 (see FIG. 4) (S106). The SQL execution request unit 64 transmits the SQL execution plan 13 created in S106 to BES 56 (S107).

Figure 8:
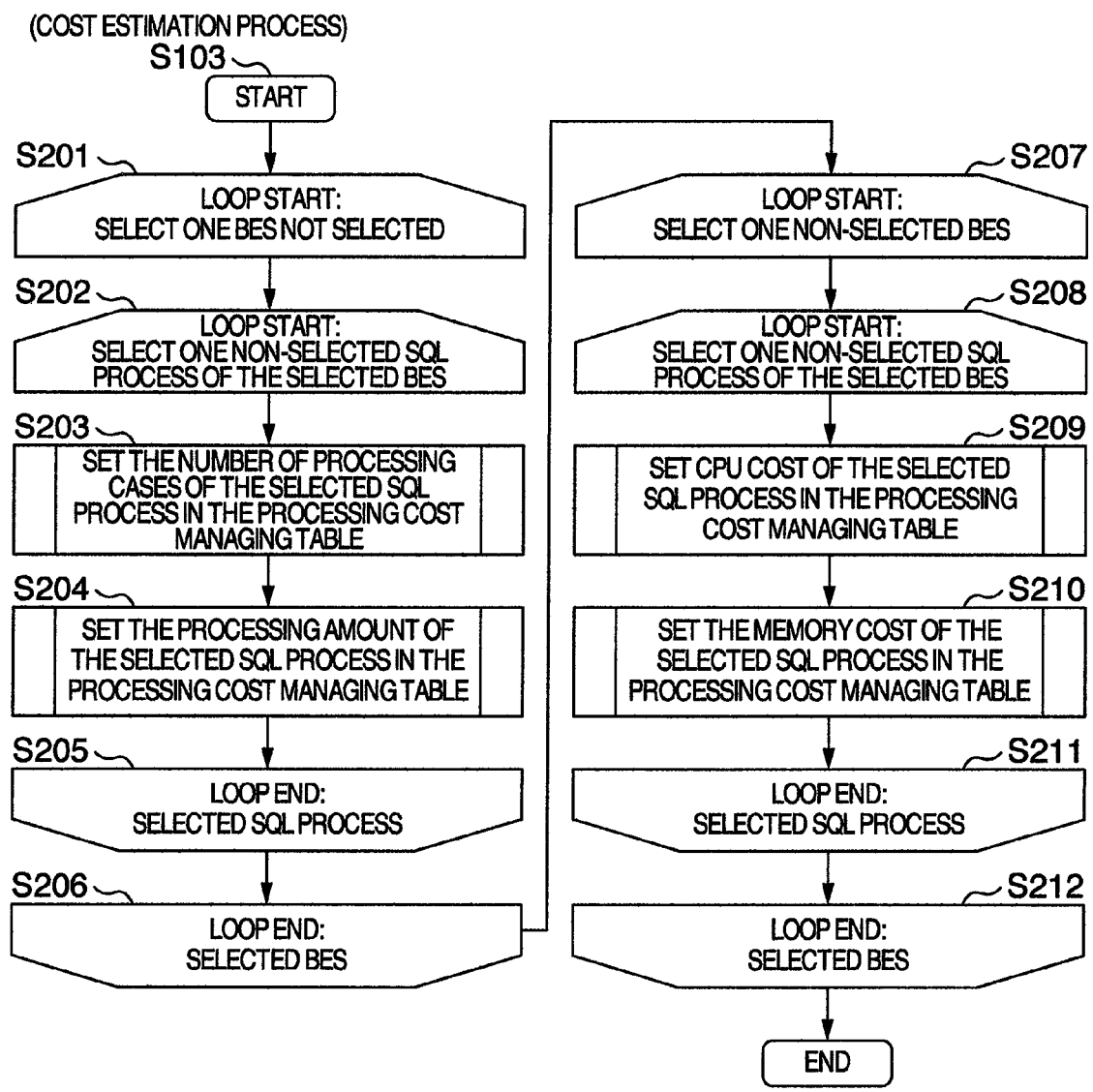
FIG. 8 is a flowchart showing a procedure of a cost estimation process according to an embodiment of the present invention.

FIG. 8 is a flowchart showing a procedure of the cost estimation process (S103) executed by the cost estimation unit 50.

Firstly, a loop (S201 to S206) is executed for selecting one by one non-selected BES in the processing cost table 17. Next, a loop (S202 to S205) is executed for selecting one by one non-selected SQL processes among the SQL processes to be executed by BES selected in S201.

The number of cases of the statistical information 16 is referenced to calculate the number of processing cases of each SQL process so as to set the number of processing cases in the processing cost managing table 17 (S203). Furthermore, the capacity of the statistical information 16 is referenced to calculate the processing amount of each SQL so as to set the processing amount in the processing cost managing table 17 (S204).

Firstly, a loop (S207 to S212) is executed for selecting one by one non-selected BES. Next, a loop (S208 to S211) is executed to select one by one non-selected SQL processes among the SQL processes to be executed by the BES selected in S207.

The number of the processing cases of the processing cost managing table 17 is referenced to calculate the CPU cost, which is set as the CPU cost in the processing cost managing table 17 (S209). Furthermore, the processing amount in the processing cost managing table 17 is referenced to calculate the memory cost, which is set for the memory cost in the processing cost managing table (S210).

Figure 9:
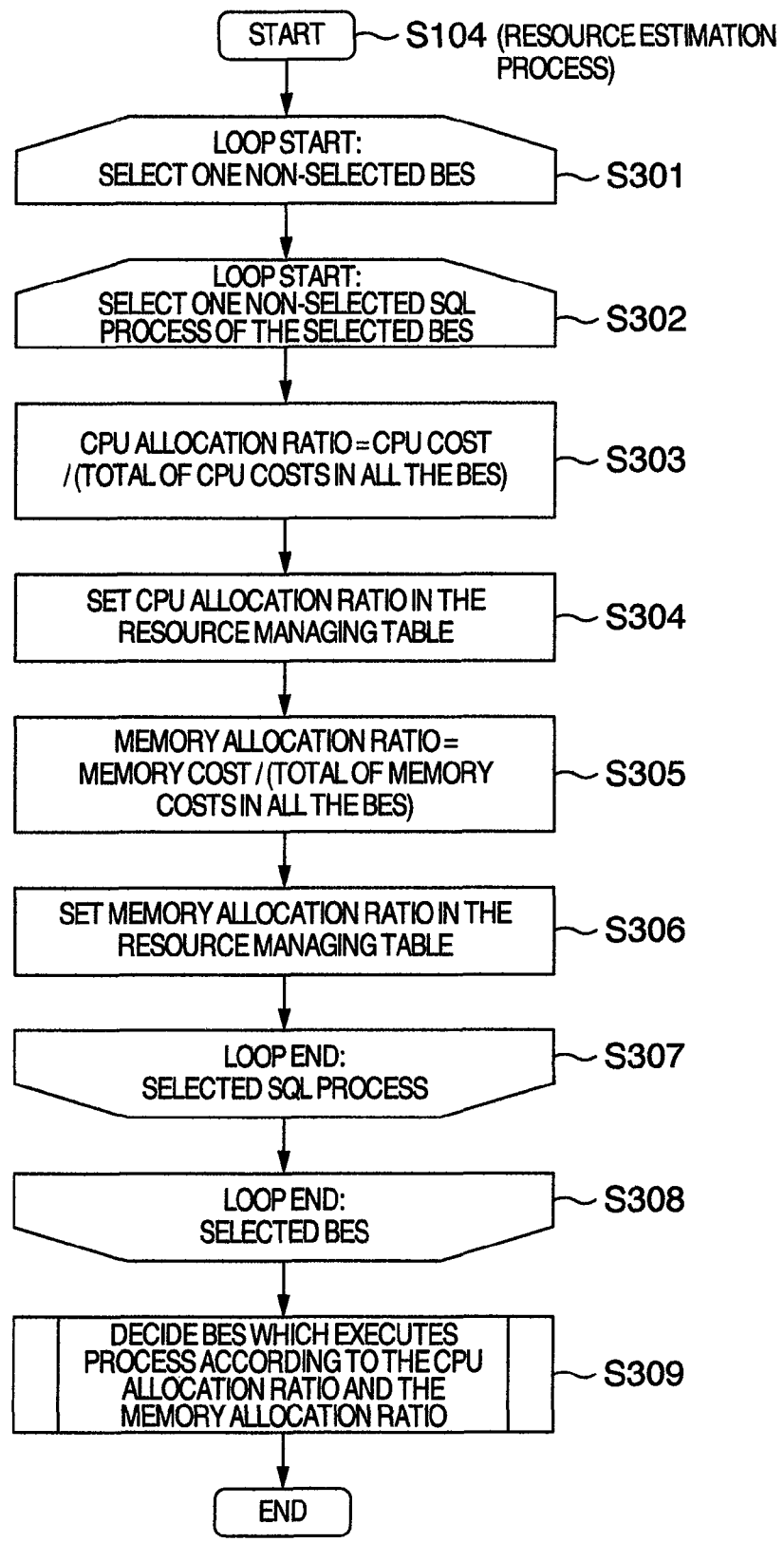
FIG. 9 is a flowchart showing a procedure of a resource estimation process according to an embodiment of the present invention.

FIG. 9 is a flowchart showing a procedure of the resource estimation process executed by the resource estimation unit 51.

Firstly, a loop (S301 to S308) is executed to select one by one non-selected BES in the resource allocation managing table 18. Next, a loop (S302 to S307) is executed to select one by one non-selected SQL processes among the SQL processes to be executed by the BES selected in S301.

The CPU cost set in the processing cost managing table 17 is referenced to calculate the CPU allocation ratio according to an expression given below (S303). According to the calculation result, the CPU allocation ratio is decided and set in the processing cost managing table 17 (S304).

CPU allocation ratio=CPU cost/(total of CPU costs in all the BES)

Furthermore, the memory cost set in the processing cost managing table 17 is set to calculate the memory allocation ration according to an expression given below (S305). According to the calculation result, the memory allocation ratio is decided and set in the processing cost managing table 17 (S306).

Memory allocation ratio=memory cost/(total of memory costs in all the BES)

After completion of the two loops, according to the CPU allocation ratio set in S304 and the memory allocation ratio, the BES 56 which executes the process of the undecided SQL process is decided (S309).

Figure 10B:
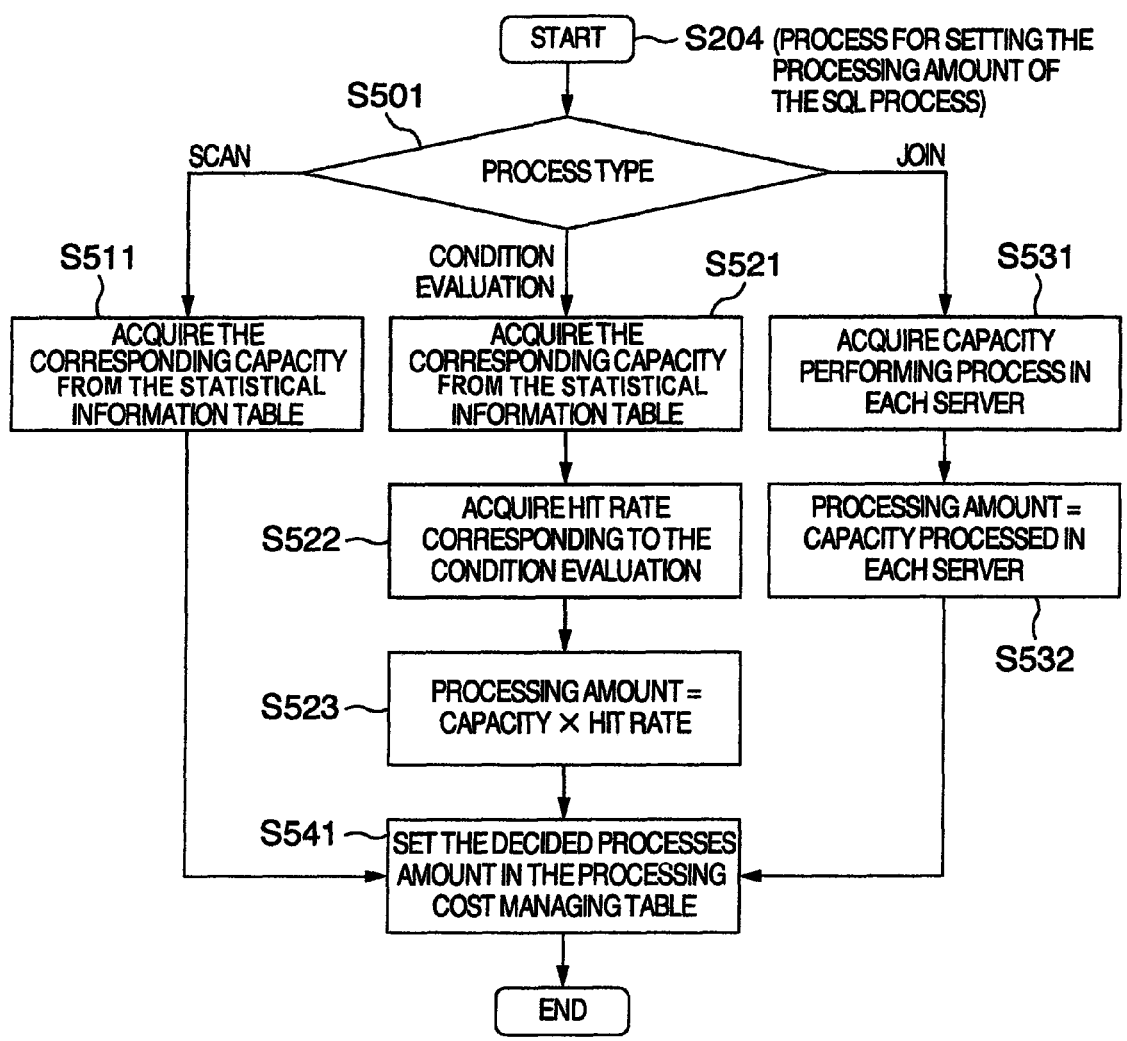

FIGS. 10A and 10B are flowcharts showing procedures for setting the number of processing cases and the processing amount in the processing cost managing table.

FIG. 10A is a flowchart for setting the number of processing cases of the SQL process in S203. According to the type of the SQL process, the process is branched to the scan, the condition evaluation, or the join (S401). The processing terminates if the process is other than these three types.

Firstly, when the SQL process is the scan (scan in S401), the number of cases of the corresponding column is acquired from the statistical information table 16 (S411).

Next, when the SQL process is the condition evaluation (condition evaluation in S401), the number of cases of the corresponding column is acquired from the statistical information table 16 (S421) so as to acquire a hit rate "0.2" corresponding to the predicate of the condition evaluation (">" in the SQL sentence of FIG. 1A) (S422). The number of cases acquired in S421 is multiplied by the hit rate acquired in S422 so as to calculate the number of processing cases (S423).

It should be noted that the correspondence information between the predicate of the condition evaluation and the hit rate is acquired from the setting information given in advance. When creating the setting information, it is preferable that the hit rate be smaller as the condition of the condition evaluation becomes more strict. For example, since the predicate (= (equal)) requiring the same hit value as a predetermined number is more strict than the predicate (> (greater)) requiring the hit value greater than the predetermined number, the hit rate is set smaller (such as 0.1).

When the SQL process is the join (join in S401), the number of condition evaluation processing cases in each BES 56 is acquired from the statistical information table 16 (S431) so as to set the number of condition evaluation processing cases in each of the acquired BES 56 for the number of join processing cases of each BES 56 (S432).

Furthermore, the number of the processing cases decided in S411, S423, or S432 is set for the corresponding number of processing cases in the cost managing table (S441), thereby terminating the processing.

FIG. 10B is a flowchart for setting the processing amount of the SQL process in S204. According to the type of the SQL process, the process is branched to the scan, the condition evaluation, or the join (S501). The processing is terminated if the type is other than these three types.

Firstly, when the SQL process is the scan (scan in S501), the corresponding capacity is acquired from the statistical information table 16 (S511).

Next, when the SQL process is the condition evaluation (condition evaluation in S401), the corresponding capacity is acquired from the statistical information table 16 (S521) so as to acquire a hit rate "0.2" corresponding to the predicate of the condition evaluation (">" in the SQL sentence of FIG. 1A) (S522) like in S422. The capacity acquired in S521 is multiplied by the capacity acquired in S522 so as to calculate the processing amount (S523).

When the SQL process is the join (join in S501), the processing amount of the condition evaluation in each BES 56 is acquired from the statistical information table 16 (S531) so as to set the processing amount of the condition evaluation in each BES 56 as the join processing amount each BES 56 (S532).

Furthermore, the processing amounts decided in S511, S523, or S532 is set for the corresponding processing amount in the cost managing table (S541), thereby terminating the processing.

It should be noted that for the estimation process of the processing cost (CPU cost, memory cost) of S432, S532, it is also possible to perform calculation according to the data contents of the tables stored in the DB storage regions 62, 62 (see FIG. 3) instead of performing calculation according to the data described in the statistical information 16 (see FIG. 4).

For example, when performing the join by distributing a plurality of table data to N units of BES, the record allocated to the i-th (i=1 to N) unit is a record selected from all the table data as such a record that when the value of the common columns in the plurality of tables is divided by N, the remainder is i−1. By calculating the number of records allocated as the i-th unit, the number of processing cases and the processing amount are decided. As compared to the method for performing the estimation only by using the statistical information indicating the outline of the table, the method performing estimation considering the content of the table can perform a highly accurate estimation although the calculation amount is increased.

Figure 11A:
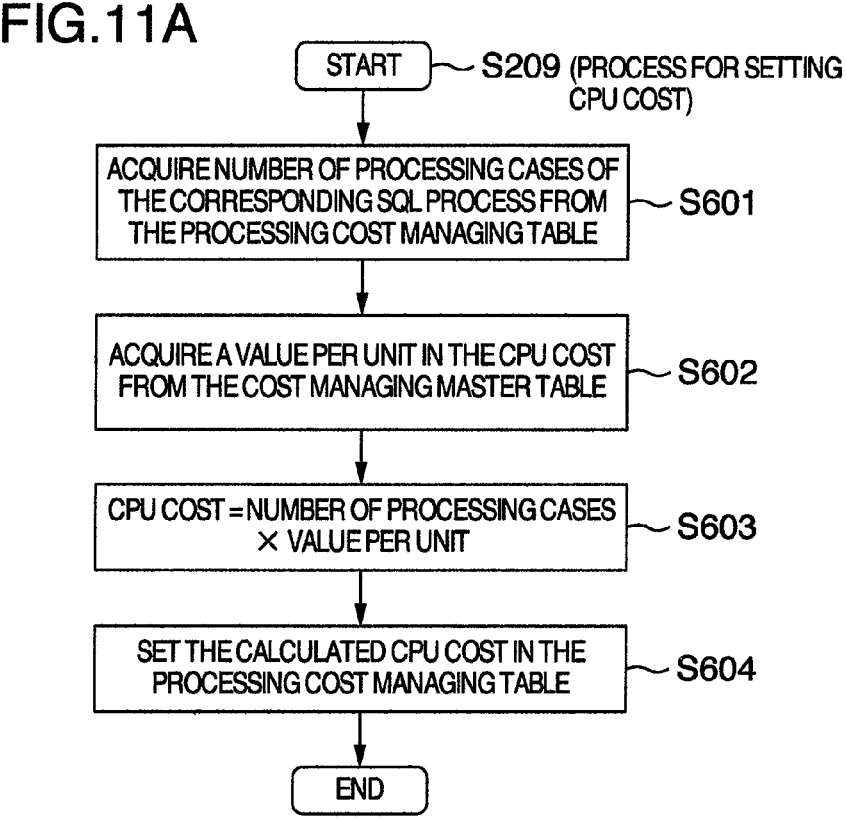
FIGS. 11A and 11B are flowcharts showing procedures for setting the CPU cost and the memory cost in the processing cost managing table according to an embodiment of the present invention.
Figure 11B:
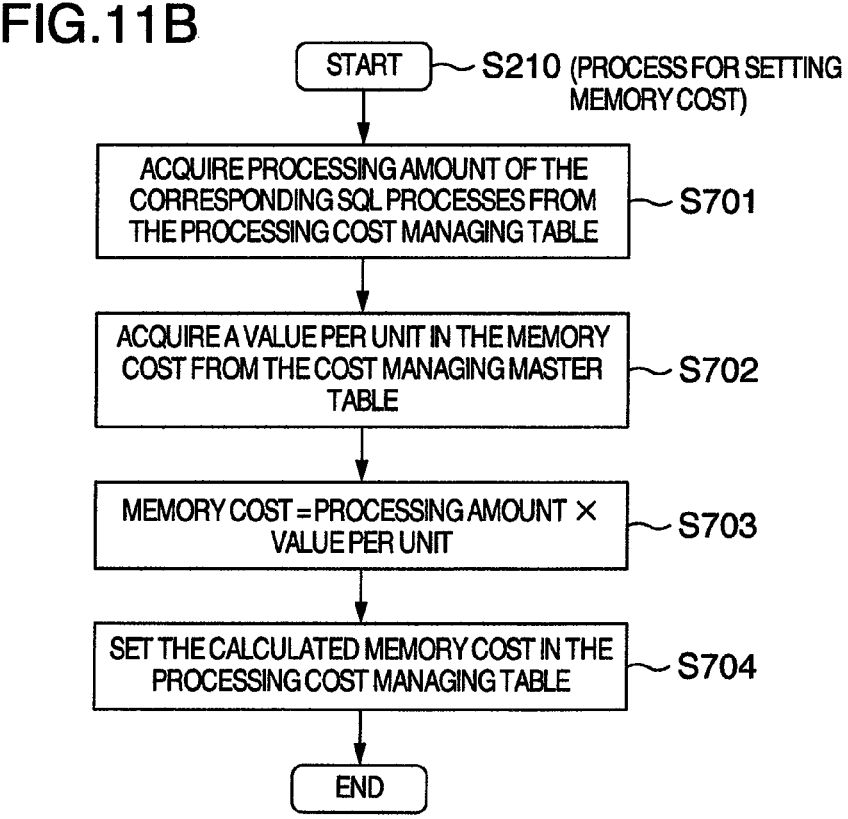

FIGS. 11A, 11B are flowcharts showing a CPU cost and a memory cost in the processing cost managing table.

FIG. 11A is a flowchart for setting a CPU cost in S209. Firstly, the number of processing cases of the corresponding SQL process is acquired from the processing cost managing table 17 (S601). Next, a value of the CPU cost per unit in the corresponding SQL process is acquired from the cost managing master table 21 (S602).

The number of processing cases acquired in S601 is multiplied by the value of the CPU cost per unit obtained in S602 so as to calculate the CPU cost (S603). The value obtained in S603 is set for the CPU cost of the SQL process in the corresponding BES 56 in the processing cost managing table 17 (S604).

FIG. 11B is a flowchart for setting a memory cost in S210. Firstly, a processing amount of the corresponding SQL process is acquired from the processing cost managing table 17 (S701). Next, a value of the memory cost per unit in the corresponding SQL process is acquired from the cost managing master table 21 (S702).

The number of processing amount acquired in S701 is multiplied by the value of the CPU cost per unit obtained in S702 so as to calculate the memory cost (S703). The value obtained in S703 is set for the memory cost of the SQL process in the corresponding BES 56 in the processing cost managing table 17 (S704).

Figure 12:
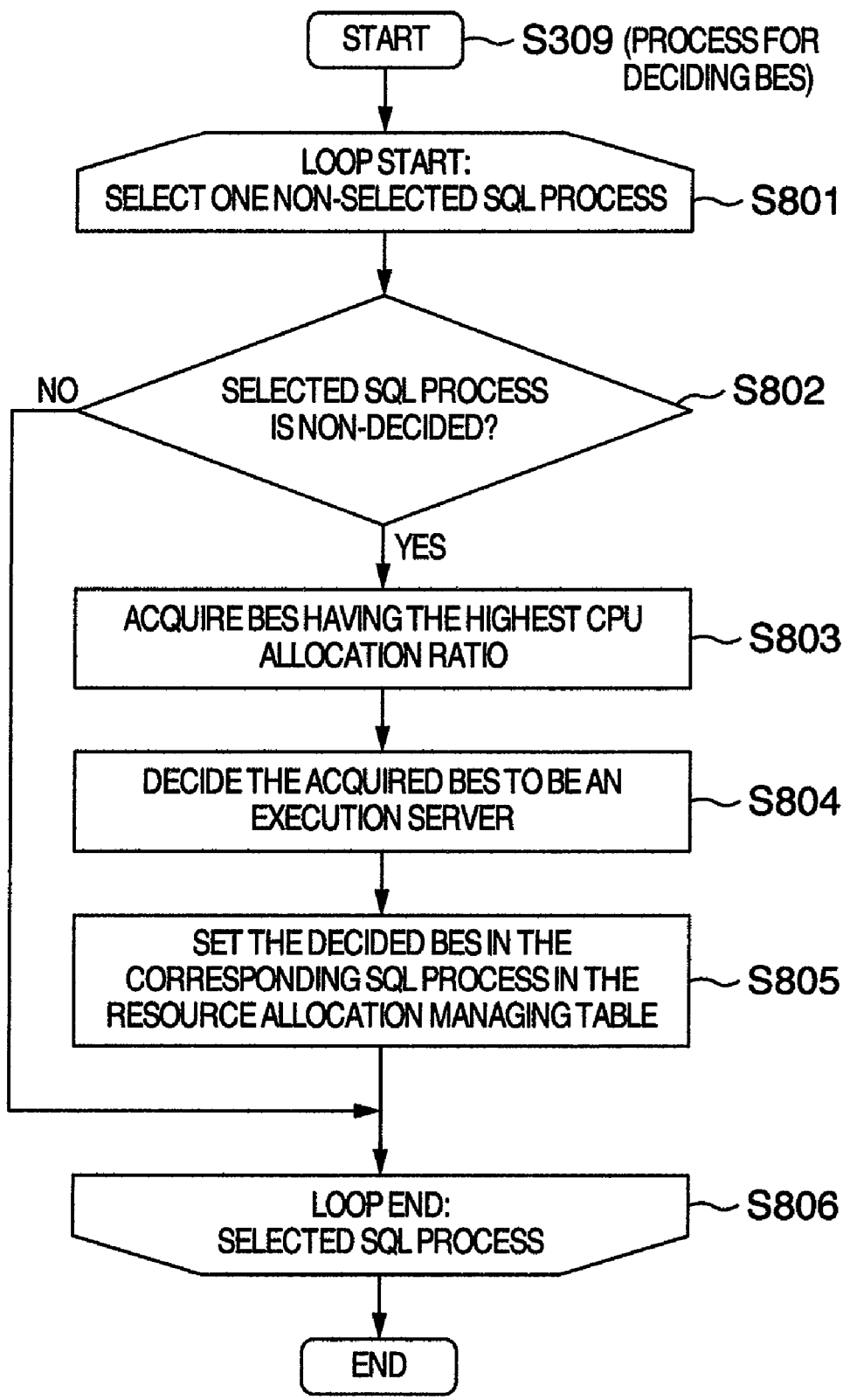
FIG. 12 is a flowchart showing a procedure for deciding a server for processing of which an execution server is undecided.

FIG. 12 is a flowchart showing a procedure for deciding a server of the process for which no execution server is decided.

Firstly, a loop (S801 to S806) is executed to select one by one non-selected SQL processes in the resource allocation managing table 18 (i.e., it is not judged whether the execution server is non-decided).

Next, it is judged whether the SQL process currently selected in S801 is non-decided (S802). If the SQL process is not non-decided (No in S802), the loop for the SQL currently selected in S801 is terminated (S806) and control is returned to S801 to select the next SQL process.

If Yes in S802, the resource allocation managing table 18 is referenced and the BES 56 having the highest CPU allocation ratio is acquired (S803). The BES 56 acquired in S803 is decided to be an execution server (S804).

Furthermore, in order to indicate that the BES 56 decided in S804 is a server for executing a non-decided process, the processing cost of the corresponding SQL process in the resource allocation managing table 18 is set for the BES 56 decided in S804 (S805). Here, the loop for the currently selected SQL process is terminated (S806) and control is returned to S801 to select the next SQL process.

According to the embodiment thus far described, by modifying the resource allocation ratio before executing the SQL, it is possible to improve the load imbalance upon execution of each SQL process in each BES 56. This increases the resource use efficiency and the process is completed rapidly. Accordingly, it is possible to increase the speed of the SQL process.

It should be further understood by those skilled in the art that although the foregoing description has been on embodiments of the invention, the inventions is not limited thereto and various changes and modifications may be made without departing from the spirit of the invention and the scope of the appended claims.

The invention claimed is:

1. A resource allocation method for a physical computer used by a Back End Server (BES) executed in a virtual computer operating on resources of the physical computer when processing an inputted Structured Query Language (SQL) request based on a database stored in an accessible storage device, wherein an access to the database to be subjected to SQL processes is of a shared everything type architecture in which the BES can process the database, the method comprising steps of:

subjecting the inputted SQL request to a syntax analysis and extracting a plurality of SQL processes from the inputted SQL request, calculating, for each of one or more process types contained in the extracted SQL processes and one or more BESs, a resource cost of a database required by the one or more BESs to perform the extracted SQL processes for which an executing BES of the one or more BESs is determined, deciding an allocation ratio for allocating the resources of the physical computer to the virtual computer in accordance with a resource cost ratio of each of the one or more BESs required to execute the extracted SQL processes, selecting one of the one or more BESs which has a highest allocation ratio in the decided allocation ratios as an executing BES for the extracted SQL processes for which an executing BES of the one or more BESs is not determined, and requesting for execution of the selected one of the one or more BESs on the virtual computer to which the resources have been allocated so as to execute the extracted SQL processes, wherein if the process type of the extracted SQL processes is a condition judgment, the step of calculating the resource cost of the database required by the one or more BESs includes multiplying the number of database cases to be subjected to the extracted SQL processes by a hit rate corresponding to the type of a predicate contained in an SQL command of the extracted SQL processes corresponding to the condition judgment, and by a predetermined coefficient.

2. The resource allocation method as claimed in claim 1, wherein the step of calculating the resource cost of the database required by the one or more BESs is followed by a step of calculating a resource cost of each of the virtual computer and other virtual computers executing the one or more BESs connected to the database required by the one or more BESs in accordance with the resource cost of the database required by the one or more BESs.

3. The resource allocation method as claimed in claim 1, wherein if the process type of the extracted SQL processes is a scan, the step of calculating the resource cost of the database required by the one or more BESs includes multiplying the number of database cases to be subjected to the extracted SQL processes by a predetermined coefficient.

4. The resource allocation method as claimed in claim 1, wherein if the process type of the extracted SQL processes is a join, the step of calculating the resource cost of the database required by the one or more BESs includes multiplying the number of database cases to be subjected to the extracted SQL processes by a predetermined coefficient.

5. The resource allocation method as claimed in claim 1, wherein the resources of the physical computer allocated to the virtual computer is includes a central processing unit (CPU) of the physical computer.

6. The resource allocation method as claimed in claim 1, wherein the resources of the physical computer allocated to the virtual computer is are memory resources of the physical computer.

* * * * *